(12) United States Patent
Spuller (10) Patent No.: US 10,814,537 B2
(45) Date of Patent: Oct. 27, 2020

(54) HOT RUNNER INJECTION NOZZLE AND ACTUATOR FOR INJECTION MOLDING DEVICE

(71) Applicant: Otto Männer Innovation GmbH, Bahlingen (DE)

(72) Inventor: Swen Spuller, Forchheim (DE)

(73) Assignee: Otto Männer Innovation GmbH, Bahlingen (DE)

(*) Notice: Subject to any disclaimer, the term of this patent is extended or adjusted under 35 U.S.C. 154(b) by 0 days.

(21) Appl. No.: 15/871,589

(22) Filed: Jan. 15, 2018

(65) Prior Publication Data

US 2018/0236700 A1 Aug. 23, 2018

(30) Foreign Application Priority Data

Feb. 17, 2017 (EP) .................................. 17156782

(51) Int. Cl.
*B29C 45/27* (2006.01)
*B29C 45/28* (2006.01)
*B22D 17/20* (2006.01)

(52) U.S. Cl.
CPC ...... *B29C 45/2735* (2013.01); *B22D 17/2023* (2013.01); *B22D 17/2053* (2013.01);
(Continued)

(58) Field of Classification Search
CPC ............ B29C 45/2735; B29C 45/2737; B29C 45/281; B29C 2945/76277;
(Continued)

(56) References Cited

U.S. PATENT DOCUMENTS 4,238,182 A * 12/1980 Mollier ............... B29C 45/2806
425/549
4,917,594 A * 4/1990 Gellert ................ B29C 45/1735
264/328.15
(Continued)

FOREIGN PATENT DOCUMENTS

DE 102012211141 1/2014
WO 0074920 12/2000
WO 2015150501 10/2015

*Primary Examiner* — Michael N Orlando
*Assistant Examiner* — Christopher W Raimund
(74) *Attorney, Agent, or Firm* — Pauley Erickson & Swanson (57) ABSTRACT

The present disclosure is directed to an injection nozzle with a nozzle head including at least one discharge opening for injecting molding material into a mold cavity of a thereto interconnected injection mold and forming therein a molded body. At least one positively controlled closure element movably supported in the nozzle head for closing a communication opening in the connected injection mold. An actuator cylinder comprises a first piston which is interconnected to the closure element. The first piston is arranged movable between a first position, in which the closure element is fully closed, and a second position in which the closure element is fully open. A second piston is interconnected to the closure element, and is arranged movable between a third position in which the second piston is not interconnected to the closure element and a fourth position in which the closure element is limited in an intermediate position.

19 Claims, 5 Drawing Sheets

(52) U.S. Cl.
CPC ........ *B29C 45/2737* (2013.01); *B29C 45/281* (2013.01); *B29C 2045/2759* (2013.01); *B29C 2045/2813* (2013.01); *B29C 2045/2831* (2013.01); *B29C 2045/2841* (2013.01); *B29C 2045/2848* (2013.01); *B29C 2045/2862* (2013.01); *B29C 2045/2872* (2013.01); *B29C 2945/76277* (2013.01)

(58) Field of Classification Search
CPC .... B29C 2045/2841; B29C 2045/2759; B29C 2045/2848; B29C 2045/2813; B29C 2045/2862; B29C 2045/2872; B29C 2045/2779; B29C 2045/2831; B29C 45/23; B29C 45/20; B22D 17/2023; B22D 17/2053
See application file for complete search history.

(56) References Cited

U.S. PATENT DOCUMENTS

| | | | | |
|---|---|---|---|---|
| 5,375,994 | A * | 12/1994 | Friderich | B29C 45/281 264/328.9 |
| 5,423,672 | A * | 6/1995 | Gordon | B29C 45/281 264/107 |
| 5,623,861 | A * | 4/1997 | Ward | B23K 11/31 137/513.3 |
| 6,228,309 | B1 * | 5/2001 | Jones | B29C 45/2806 264/328.8 |
| 2003/0099735 | A1 | 5/2003 | Yu | |
| 2006/0233911 | A1 | 10/2006 | Spuller | |
| 2008/0152752 | A1 | 6/2008 | Klobucar et al. | |
| 2008/0317898 | A1 * | 12/2008 | Fairy | B29C 45/2735 425/549 |

* cited by examiner

HOT RUNNER INJECTION NOZZLE AND ACTUATOR FOR INJECTION MOLDING DEVICE

CROSS-REFERENCE TO RELATED APPLICATIONS

This application claims benefit of priority from European (EP) Patent Application No. 17156782.9, filed Feb. 17, 2017, which is herein incorporated by reference in its entirety.

TECHNICAL FIELD

The present disclosure relates to a hot runner injection nozzle for an injection molding device and an actuator for such an injection nozzle, as well as a method to operate the injection nozzle.

BACKGROUND

WO15150501A1 was first published in October 2015 in the name of the same applicant as the herein disclosed invention. It is directed to a hot runner nozzle for side gating in a hot runner injection molding apparatus. A nozzle that is connectable to a melt outlet opening of a hot runner manifold. It comprises a nozzle flange portion, a nozzle body portion and a nozzle bridge portion. The nozzle bridge portion has at least two adjacently arranged nozzle tip sections. At least two valve pins are coupled to a valve pin actuating device which is moveable back and forth along a first axis. The at least two valve pins are moveable along a second axis which is arranged at an angle to the first axis. The nozzle tip sections are connected adjacent to the nozzle body portion and separated by a nozzle bridge separator which is designed so as to accommodate movements of the nozzle tip sections.

DE102012211141A1 was first published in January 2014 in the name of HFT GmbH. It is directed to nozzle device which has a central channel branched out into two side channels which comprises outlet openings for connecting to injection molds. Heating devices are provided for the side channels, respectively. The heating devices are separately adjustable. The heating devices are arranged at circumferences of the respective side channels and surrounded by a shell. The side channels are equipped with respective temperature sensors which are arranged adjacent to the outlet openings.

US2008152752A was first published in June 2008 in the name of Mold Masters Ltd. It is directed to an injection molding apparatus which includes an injection manifold having an inlet and a melt channel. The manifold melt channel branches to a plurality of melt channel outlets. A hot runner injection nozzle includes an axial melt channel extending along a central axis and communicating with one of the manifold melt channel outlets. The nozzle further includes at least two angled melt channels disposed at an angle to the central axis. At least two nozzle tips are provided, and each includes a nozzle tip melt channel in communication with one of the angled melt channels. A valve pin is disposed at least partially within the axial melt channel coaxially with the central axis and movable within the axial melt channel. Lateral valve pins movable within the nozzle tip melt channels are disposed at an angle to the valve pin. Linkage elements continuously connect the lateral valve pins to the valve pin. Axial movement of the valve pin is transmitted through the linkage elements to the lateral valve pins to open and close communication between the nozzle tip melt channels and the lateral mold gates.

US2006233911A was first published in October 2008 in the name of the same applicant as the herein disclosed invention. US '911 is directed to an injection molding nozzle with a nozzle head including at least one discharge opening. A closure element for closing the discharge opening is movably supported in the nozzle head in order to control the supply of melt material to a communication opening in an injection mold. The closure element is operable by a drive mechanism provided with a short stroke actuating means for displacing the closure element in a direction opposite to the closing direction of the closure element by a predetermined short distance so as to automatically retract the closure element by the predetermined short distance when it is no longer biased by the actuating means in the closing direction.

US2003099735A was first published in May 2003 in the name of Yudo Co. Ltd. It is directed to a multi-position control cylinder for hot runners of injection molding machines. This multi-position control cylinder has a multi-stage hole formed in a unit body, a first cylinder seated in the lower part of the multi-stage hole, and a first piston set in the first cylinder. In addition, a second cylinder is seated in the multi-stage hole at a position above the first cylinder, with a second piston set in the second cylinder. A valve pin is coupled to the second piston using a valve pin coupling member such that the valve pin extends downward from the second piston while passing through the first piston, with the lower portion of the valve pin inserted into the upper portion of the first piston. An anti-vacuum gap is formed between the first piston and the valve pin coupling member.

A cylinder head covers the top of the multi-stage hole at a position above the second piston.

WO0074920 was first published in December 2000 in the name of Husky Injection Molding Systems Ltd. It is directed to an injection nozzle having a valve stem which is mounted in a nozzle body. The valve stem is moving from an open position retracted from the injection orifice permitting the flow of resin to the mold cavity, to a closed position blocking the injection orifice and preventing the flow of resin to the mold cavity and to an advanced position within the gate nub area to assist in the ejection of a molded part and clear the gate nub area.

The injection nozzles and their actuators known from the prior art often are not reliable for precise side injection of plastic material into a mold cavity. One problem results from the fact that the position of the closure element (valve pin) is often not defined and therefore may be wrong resulting in an increased risk of total loss of the thereto related mold. The problem results from the fact that the valve pin may still reach into the cavity of a thereto connected mold when wrong positioned thereby damaging the mold. For secure operation it is often advantageous that the valve pin is in a slightly rearward position not reaching into the cavity. This especially counts for side gating injection nozzles.

SUMMARY

One aspect of the present disclosure is directed to a hot runner injection nozzle for an injection molding device to overcome the above described problem. A further aspect of the present disclosure is directed to an actuator cylinder for the injection nozzle. A still further aspect to the present disclosure is directed to a drive shaft for interconnecting an actuator and a thereto related closure element. A still further aspect of the present disclosure is directed to a method for operating an injection nozzle.

The injection nozzle comprises a nozzle head including at least one discharge opening for injecting pressurized melted plastic material into a mold cavity of a thereto interconnected injection mold and forming therein a molded body. Furthermore the injection nozzle comprises at least one positively controlled closure element (valve pin) movably supported in the nozzle head for closing a communication opening in the thereto connected injection mold.

An actuator cylinder is interconnected to the closure element. It comprises a cylinder housing in which a first piston is arranged. The first piston is interconnected to the at least one closure element and is arranged movable between a first position in which the closure element is fully closed and a second position in which the closure element is fully open.

A second piston is directly or indirectly interconnectable to the closure element as well. It is arranged movable between a third position in which the second piston is not interconnected to the closure element and a fourth position in which the movement of the closure element is limited by the second piston in an intermediate position between the fully opened and the fully closed position. In this position it can be avoided that the closure element protrudes into, respectively above the communication opening in an unwanted manner. Thereby it can be effectively avoided that damage of the closure element occurs due to inappropriate positioning. Depending on the mold design the first and the second piston can be arranged in the same or spaced apart in a different housing. The first piston and the second piston each comprise an active surface, wherein the active surface of the first piston preferably is smaller than the corresponding active surface of the second piston, such that when pressurized with the same pressure the second piston has priority over the movement of the first piston. Thereby it can be avoided that the first piston dominates the second piston in an inappropriate manner whereby misalignment of the closure element would become possible.

In a preferred variation the second piston when in the fourth position directly interacts with the first piston in that it limits the movement of the first piston. Thereby the closure element remains locked with respect to its closing direction in the intermediate position. The second piston can be at least in the fourth position interconnected to the first piston, e.g. by a bushing as will be described hereinafter in more detail.

To reduce the outer size of the actuator and to harmonize the outer diameter of the second piston with respect to the first piston, the second piston may comprise a first part and a second part which are interconnected to each other e.g. by a bushing or a different means. In a variation the diameter of the first piston and the diameter of the first and the second part of the second piston deviate from each other by a maximum of 10 mm. The first and the second piston can be—despite to their different active surfaces—arranged in the same outer housing having an in general constant outer diameter.

The first and the second piston are preferably arranged in the same cylinder housing. However, if necessary e.g. due to space saving reasons, the cylinder housing can comprise several parts housing the first or the second piston. Alternatively or in addition the cylinder housing can at least partially be integrated in an injection mold, i.e. forming part thereof.

Good results can be achieved when the first piston delimits with respect to the cylinder housing a first fluid chamber and a second fluid chamber and the second piston delimits with respect to the cylinder housing a third fluid chamber and a fourth fluid chamber, wherein
(a) the first fluid chamber, when pressurized by a fluid, causes the first piston to go to the first position;
(b) the second fluid chamber when pressurized by a fluid causes the first piston to go to the second position; and
(c) the third fluid chamber (14) when pressurized by a fluid causes the second piston to go to the third position;
(d) the fourth fluid chamber (15) when pressurized by a fluid causes the second piston (8) to go to the fourth position.

When the second piston comprises a first and a second part (section) the third as well as the fourth chamber correspondingly comprise two segments. Each pair is preferably directly functionally interconnected to each other e.g. by a thereto related connection channel. An advantageous arrangement can be achieved when the connection channel is arranged in the second piston.

The closure element and the first piston are preferably interconnected to each other by a drive shaft directly or indirectly. The closure element and the drive shaft can be arranged in the same direction or at an angle to each other. In a special arrangement the drive shaft is coaxially in line with the closure element.

In case of an angled arrangement of the injection nozzle the present disclosure provides in one aspect an improved cam mechanism which is described hereinafter in more detail in accordance with FIG. 3. The cam mechanism is considered to be in individual inventive concept and can be used with different actuators. It is therefore reserved to file one or more divisional patent applications directed to it.

A method for operating an injection nozzle according to the present disclosure normally comprises the following method steps:
(a) During an injection molding cycle pressurizing the first piston such that the thereto interconnected closure element moves into the fully open position.
(b) After sufficient melted plastic material is injected into the thereto connected injection mold, pressurizing the first piston such that it causes the thereto interconnected closure element to move into the fully closed position.
(c) After the injected plastic material has cured to a certain degree, pressurizing the second piston such that the thereto interconnected closure element is moved into the intermediate position.
(d) Opening the injection mold and removing the therein formed molded body.

It is to be understood that both the foregoing general description and the following detailed description present embodiments, and are intended to provide an overview or framework for understanding the nature and character of the disclosure. The accompanying drawings are included to pro-vide a further understanding, and are incorporated into and constitute a part of this specification. The drawings illustrate various embodiments, and together with the description, serve to explain the principles and operation of the concepts disclosed.

BRIEF DESCRIPTION OF THE DRAWINGS

The herein described disclosure will be more fully understood from the detailed description given herein below and the accompanying drawings which should not be considered limiting to the invention described in the appended claims. The drawings are showing:

DETAILED DESCRIPTION

Reference will now be made in detail to certain embodiments, examples of which are illustrated in the accompanying drawings, in which some, but not all features are shown. Indeed, embodiments disclosed herein may be embodied in many different forms and should not be construed as limited to the embodiments set forth herein; rather, these embodiments are provided so that this disclosure will satisfy applicable legal requirements. Whenever possible, like reference numbers will be used to refer to like components or parts.

Figure 1:
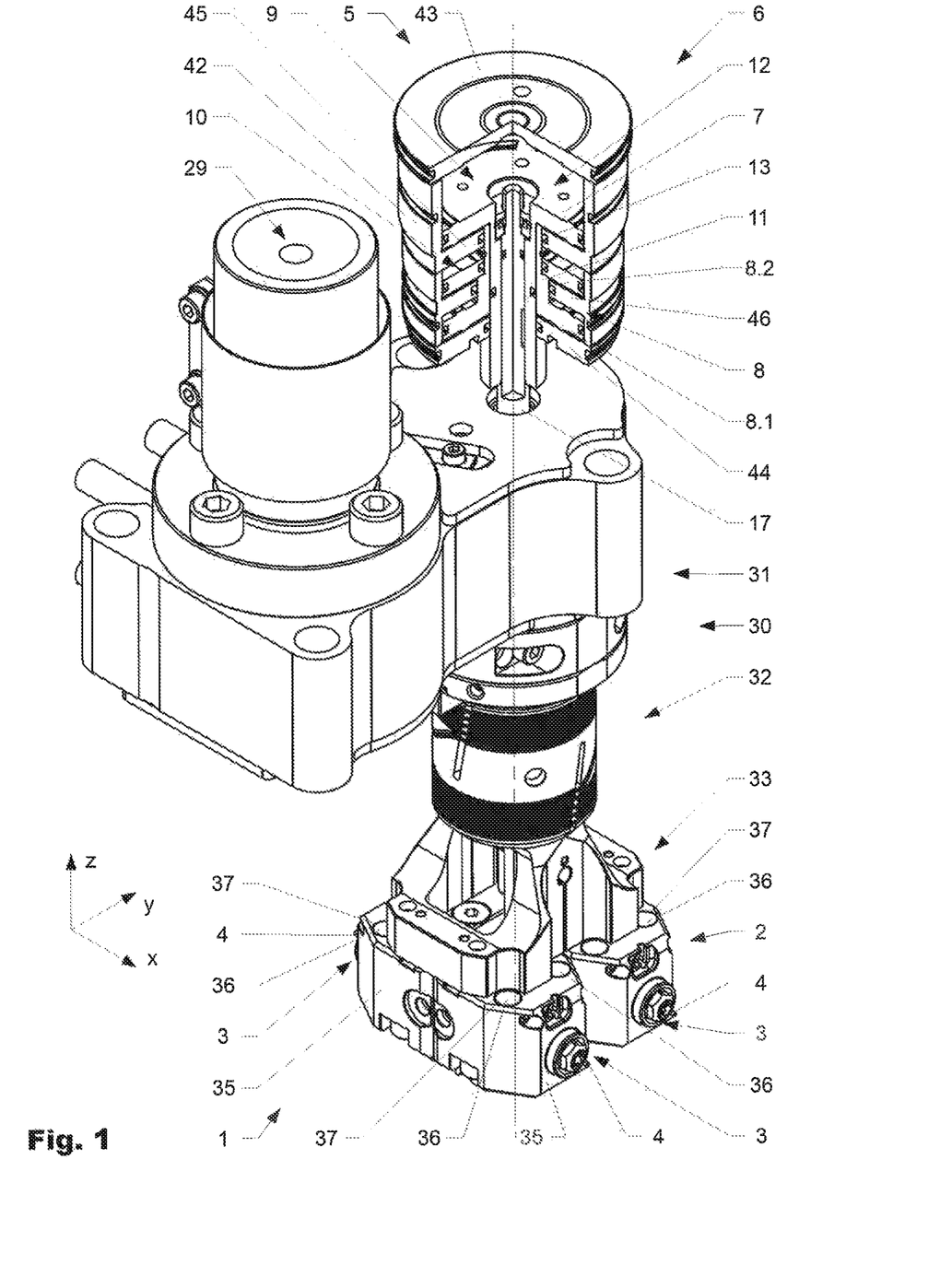
FIG. 1 An injection nozzle according to the present disclosure in a perspective view from above.

FIG. 1 shows a hot runner injection nozzle 1 according to the present disclosure in a perspective view from above. The injection nozzle 1 comprises an actuator cylinder 5 which is shown in a partially cut manner, such that the inside becomes apparent. In a cylinder housing 6 a first and a second piston 7, 8 are arranged linearly moveable with respect to the housing 6 and with respect to each other (z-direction). The second piston 8 comprises a first part 8.1 and a second part 8.2 which are interconnected to each other by a bushing 11. In the shown variation the second piston 8 is arranged coaxial to the first piston 7. The second piston 8, respectively the bushing 11, acts as a linear bearing for the first piston 7. The housing 6 comprises a side wall 42, a top wall 43, a bottom wall 44 and a first and a second intermediate wall 45, 46.

The injection nozzle 1 further comprises a nozzle head 2 including at least one discharge opening 3 for injecting melted material into a mold cavity of a thereto interconnected injection mold (not shown) and forming therein a molded body. At least one positively controlled closure element 4 is movably supported in the nozzle head 2 for closing a communication opening in the thereto connected injection mold. The actuator cylinder 5 is interconnected to the closure element 4 by a drive shaft 17 which extends across the bottom wall 44 of the housing 6.

As visible in the drawings, the herein described variation of the injection nozzle 1 is a side gating nozzle, wherein at least one closure element 4 is arranged movable in a first direction (x-direction) wherein the first and the second piston 7, 8 are arranged moveable in a second direction (z-direction). The first and the second direction are arranged at an angle with respect to each other. In the shown variation the angle is 90°, however other angles are in principle possible.

The actuator cylinder 5 is arranged at a rear end of a nozzle housing 30. The nozzle housing 30 comprises a nozzle flange 31 and a nozzle body section 32. With respect to the viewer's position at the lower end a nozzle bridge portion 33 is interconnected to the nozzle body section 32 and carries the nozzle head 2 as described herein above. The nozzle head 2 houses the closure element 4 and a cam mechanism 18 which interconnects the closure elements 4 with the actuator cylinder 5. The cam mechanism 18 is described in accordance with FIG. 3 in more detail hereinafter.

The first piston 7 delimits with respect to the cylinder housing 6 a first fluid chamber 12 (in the drawing above to the top wall 43) and a second fluid chamber 13 (in the drawing below to the first intermediate wall 45). The second piston 8 delimits with respect to the cylinder housing 6 a third fluid chamber 14 (to the first intermediate wall 45) and a fourth fluid chamber 15 comprising a first segment 15.1 (to the bottom wall 44) and a second segment 15.2 (to the second intermediate wall 46) which are interconnected to each other by a connection channel 16. In the shown variation the connection channel 16 is arranged in the bushing 11.

As visible in FIG. 1 the nozzle head 2 comprises in the shown variation per closure element 4 a closure element housing 35 which houses the closure element 4 on the inside. Inside the closure element housing 35 at least one distribution channel (not shown in detail) is arranged which is interconnected to an inlet opening 29 and guides melted plastic material from the inlet opening 29 to the discharge opening 3, wherein the flow of the melted plastic material is controlled by the actuator cylinder 5 via the thereto interconnected closure elements 4 and the cam mechanism 18. At a time two closure element housings 35 are arranged back to back with respect to each other, wherein the closure elements 4 are arranged coaxial with respect to and opposite to each other (x-direction). Two pairs of closure element housings 35 are arranged in a lateral direction (y-direction) adjacent to each other comprising in total four discharge openings 3. The closure elements 4 are arranged parallel to each other. All four closure elements 4 of the shown injection nozzle 1 are interconnected to and controlled by the actuator cylinder 5 via the cam mechanism 18.

In each closure element housing 35 at least one heating element 36 is arranged in a thereto related bore 37. Each closure element housing 35 may comprise or be interconnected to temperate sensors (not shown in detail) which allows one to control the temperature of each closure element housing 35 separately. As it can be seen in the drawings on either side of the control elements 4 a heating element 36 is arranged in a symmetric manner. Due to the slim design it is possible to arrange the heating elements 36 very close to the control elements 4. This offers the advantage that the temperature of each discharge opening 3 can be individually controlled.

Figure 2:
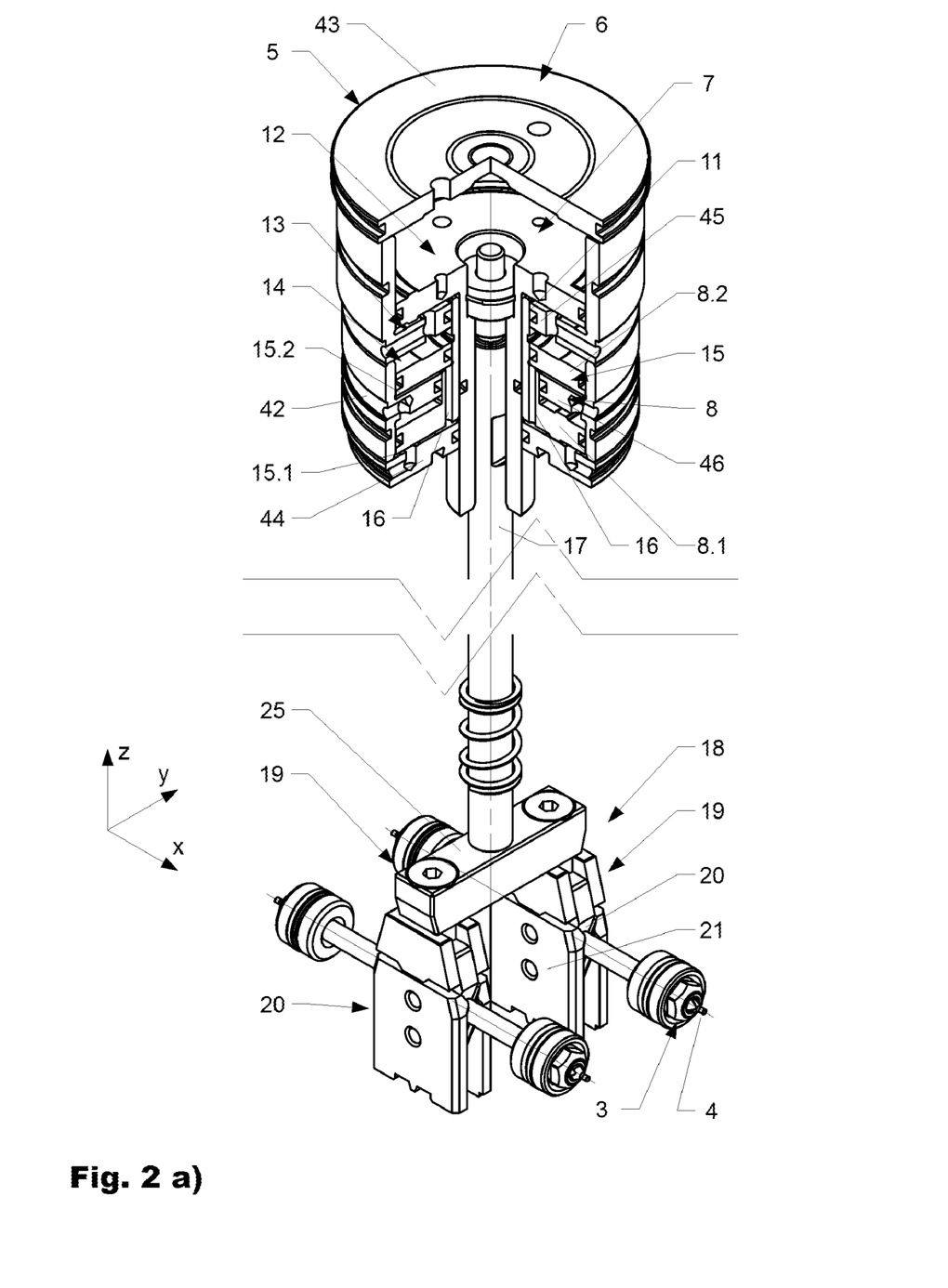
FIG. 2 The actuator and the thereto interconnected closure element in three different positions shown in FIGS. 2(a), 2(b), and 2(c)

In FIG. 2a through FIG. 2C the actuator cylinder 5 and the thereto via a cam mechanism 18 interconnected closure element 4 can be seen in three different positions. The housings of the injection nozzle are left away, such that the inside becomes better apparent. The first piston 7 is arranged movable between a first position (see FIG. 2a) in which the closure element 4 is fully closed (i.e. most outward position with respect the discharge opening 3). In a second position (see FIG. 2C) the closure element 4 is fully open (i.e. most inward position with respect the discharge opening 3).

The second piston 8 is also interconnected to the closure element 4 (in the shown variation via the first piston 7 as will be described in more detail hereinafter) arranged movable between a third position (see FIGS. 2a and 2c) in which the second piston 8 is not interconnected to the closure element 4 and a fourth position (see FIG. 2b) in which the closure element 4 is with respect to the discharge opening limited in an intermediate position between the fully opened and the fully closed position.

The first fluid chamber 12 when pressurized by a fluid causes the first piston 7 to go to the first position, while the second fluid chamber 13 when pressurized by a fluid causes the first piston 7 to go to the second position. The third fluid chamber 14 when pressurized by a fluid causes the second piston 8 to go to the third position and the fourth fluid chamber 15 when pressurized by a fluid causes the second piston 8 to go to the fourth position.

If appropriate the second fluid chamber 13 and the third fluid chamber 14 can be supplied with pressurized fluid by a common supply line 27 (see FIG. 2C). Thereby the first piston 7 can be moved to the second position, while the second piston is moved simultaneously to the third position.

An active surface g of the first piston 7 is smaller than a corresponding total active surface 10 of the second piston 8, such that when pressurized with the same pressure the second piston 8 has priority over the movement of the first piston 7. As visible in FIG. 2b the second piston 8 when in the fourth position limits the movement of the first piston 7 such that the closure element 4 remains in the intermediate position. In this intermediate position the closure element 4 does not extend into related the mold cavity (not shown in detail). Thereby it is secured that parts made are not damaged when opening the mold cavity to remove the molded body made therein.

The injection nozzle 1 comprises in total four discharge openings 3 of which each can be opened and closed by a thereto related closure element 4. Two closure elements 4 are grouped forming a first and a second pair. The two closure elements 4 forming a pair are arranged coaxial with respect to each other and are interconnected by a thereto related common wedge 19 to the actuator cylinder 5. The two wedges 19 as visible are interconnected by a bridge element 25 to the drive shaft 17.

If appropriate the injection nozzle may comprise a transport securing device as indicated in FIG. 2c. The cylinder housing 6 therefore comprises a bore 38 and the first piston 7 a thereto coaxially arranged threaded hole 39. Thereby it becomes possible to attach the first piston 7 to the housing 6 in a secure position. The transport securing device should be considered a separate inventive concept, which may be made subject of one or several divisional patent applications.

Figure 3:
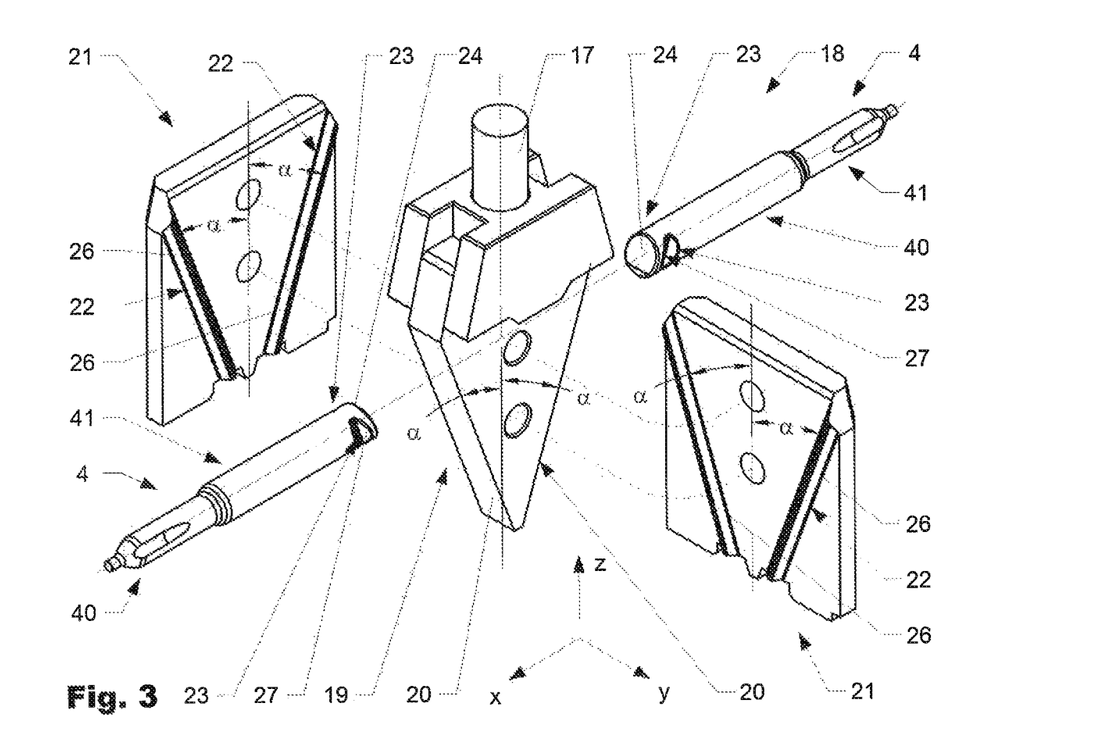
FIG. 3 The cam mechanism in an exploded view.

FIG. 3 shows the cam mechanism 18 as herein mentioned above in an exploded view and in a simplified manner. The assembly of the exploded parts is indicated by dotted lines. The cam mechanism 18 corresponds to the cam mechanism 18 as shown in FIG. 2a through FIG. 2C. It is shown without the bridge element 25 which interconnects two neighboring wedges 19 arranged laterally adjacent to each other. While the wedge 19 is (with respect to the viewer's direction) arranged linearly moveable in z-direction, the closure elements 4 are arranged linearly moveable in x-direction (perpendicular to the moving direction of the wedge 19, if appropriate other angles would be possible). The closure elements 4 are arranged symmetric with respect to the z-axis.

The wedge 19 comprises per closure element 4 a first drive surface 20 arranged at an angle α with respect to the moving direction (z-direction) of the wedge 19. Depending on the field of application the first drive surface 20 can have a non-flat design. The first drive surface 20 is foreseen to interact at least during a closing movement of the closure element 4 with a second drive surface 24 arranged at the closure element 4 thereby pushing the closure element 4 in an outward direction away from each other. In that the wedge 19 is moved in −z-direction, due to the wedged arrangement of the first drive surfaces 20 at an angle α, the first drive surfaces 20 push via the second drive surfaces 24 the closure elements 4 apart from each other in an outward direction. The second drive surfaces 24 are preferably arranged as well at an angle α with respect to z-direction (90°—α with respect to x-direction).

To move the closure elements 4 in the opposite direction (against each other), each wedge 19 comprises or is interconnected to at least one third drive surface 26 which interacts at least during opening of the thereto related closure element 4 with a thereto related fourth drive surface 27 arranged at the closure element 4. In the shown variation a first and a second third drive surface 26 are arranged at a first and a second protrusion 22 which extend along a first and a second side plate 21. The side plates 21 are arranged in the mounted position (see e.g. FIG. 2a) opposite to each other with respect to the wedge 19. The wedge 19, the first and the second side plates 21, as well as the first and the second protrusions 22 can be made in one piece. However, it is advantageous to design at least one side plate 21 removable as shown herein.

The fourth drive surfaces 27 are arranged in a notch 23 arranged in a first and a second notch 23 arranged at a rear end of a thereto related closure element 4. If appropriate the fourth drive surfaces 27 can be arranged at a protrusion as well, e.g. at a shoulder extending outwardly (not shown in detail). Alternatively the third drive surfaces 26 can be arranged in a recess formed in a side plate (not shown in detail). The first and third drive surfaces 20, 26 both extend in the same general direction (parallel to each other), i.e. the distance between them remains constant.

The closure elements 4 of the shown variation are having a cylindrical design with several diameters. A bearing surface 40 is arranged in a rearward section and a sealing surface 41 is arranged in a forward section (close to a discharge opening). The bearing surface 40 is used to support the closure element 4 with respect to the thereto related closure element housing 35 as shown in FIG. 1. The first and the second notch 23 are arranged in symmetric manner at the bearing surface 40. The notch has an in general V-shaped cross-section which matches to the cross-section of the protrusion 22, which has in the shown variation an in general V-shaped cross-section as well. The V-shaped cross-sections offer advantages and improve self-centering of the elements during operation. Depending on the field of application other cross-sections are applicable (e.g. U-shaped).

The improved cam mechanism 18 can in principle be used in connection with other nozzles/actuators and should thus be considered a separate inventive concept, which may be made subject of one or several divisional patent applications. The first, the second, the third and the fourth drive surfaces are preferably arranged that during moving of the closure elements 4 apart, the first and the second drive surfaces 20, 24 are engaged and the third and the fourth drive surfaces 26, 27 remain disengaged, while during moving of the closure elements 4 against each other, the third and the fourth drive surfaces 26, 27 are engaged and the first and the second drive surfaces 20, 24 remain disengaged.

While the invention has been described with respect to a limited number of embodiments, those skilled in the art, having benefit of this disclosure, will appreciate that other embodiments can be devised which do not depart from the scope of the invention as disclosed herein. The words used in the specification are words of description rather than limitation, and it is understood that various changes may be made without departing from the spirit and scope of the invention.

| LIST OF DESIGNATIONS | |
|---|---|
| x | First direction |
| z | Second direction |
| 1 | Injection nozzle |
| 2 | Nozzle head |

LIST OF DESIGNATIONS

| | |
|---|---|
| 3 | Discharge opening |
| 4 | Closure element (valve pin) |
| 5 | Actuator cylinder |
| 6 | Cylinder housing |
| 7 | First piston |
| 8 | Second piston |
| 8.1 | First part (second piston) |
| 8.2 | Second part (second piston) |
| 9 | Active surface (first piston) |
| 10 | Active surface (second piston) |
| 11 | Bushing (between first and second piston) |
| 12 | First fluid chamber |
| 13 | Second fluid chamber |
| 14 | Third fluid chamber |
| 15 | Fourth fluid chamber |
| 15.1 | First segment |
| 15.2 | Second segment |
| 16 | Connection channel |
| 17 | Drive shaft |
| 18 | Cam mechanism |
| 19 | Wedge |
| 20 | First drive surface (wedge) |
| 21 | Side plate |
| 22 | Protrusion |
| 23 | Notch |
| 24 | Second drive surface (closure element) |
| 25 | Bridge element |
| 26 | Third drive surface |
| 27 | Fourth drive surface |
| 28 | Pressure pipe |
| 29 | Inlet opening |
| 30 | Nozzle housing |
| 31 | Nozzle flange |
| 32 | Nozzle body section |
| 33 | Nozzle bridge portion |
| 34 | Nozzle tip retainer |
| 35 | Closure element housing |
| 36 | Heating element |
| 37 | Bore (for heating element) |
| 38 | Bore (transport securing device) |
| 39 | Threaded hole (transport securing device) |
| 40 | Bearing surface |
| 41 | Sealing surface |
| 42 | Side wall |
| 43 | Top wall |
| 44 | Bottom wall |
| 45 | First intermediate wall |
| 46 | Second intermediate wall |

The invention claimed is:

1. An injection nozzle with
   a. a nozzle head including at least one discharge opening for injecting melted plastic material into a mold cavity of a thereto interconnected injection mold and forming therein a molded body,
   b. at least one positively controlled closure element which is movably supported in the nozzle head for closing a communication opening in the thereto connected injection mold, and
   c. an actuator cylinder comprising
      i. a first piston which is interconnected to the at least one closure element is arranged movable between
         1. a first position in which the closure element is fully closed and
         2. a second position in which the closure element is fully open, and
      ii. a second piston is arranged movable between a third position in which the second piston is not interconnected to the closure element and a fourth position in which the second piston is interconnected to the closure element and the closure element is thereby limited in an intermediate position between the fully opened and the fully closed position;
   wherein an active surface of the first piston is smaller than a corresponding active surface of the second piston, such that when pressurized with the same pressure the second piston has priority over the movement of the first piston;
   wherein the second piston comprises a first part and a second part that are axially spaced with respect to each other by a bushing that interconnects the first part and the second part, wherein the bushing extends between the first part and the second part of the second piston and wherein the first part and the second part of the second piston are arranged around the bushing and the first piston extends inside the bushing;
   wherein the second piston is in the fourth position interconnected to the first piston by the bushing;
   wherein the bushing acts as linear bearing for the first piston;
   wherein the first piston delimits with respect to a cylinder housing a first fluid chamber and a second fluid chamber and the second piston delimits with respect to the cylinder housing a third fluid chamber and a fourth fluid chamber, wherein
   the first fluid chamber when pressurized by a fluid causes the first piston to go to the first position,
   the second fluid chamber when pressurized by a fluid causes the first piston to go to the second position,
   the third fluid chamber when pressurized by a fluid causes the second piston to go to the third position, and
   the fourth fluid chamber, when pressurized by a fluid, causes the second piston to go to the fourth position; and
   wherein the fourth chamber comprises two segments which are interconnected to each other by a connection channel.

2. The injection nozzle according to claim 1, wherein the second piston when in the fourth position limits the movement of the first piston such that the closure element remains in the intermediate position.

3. The injection nozzle according to claim 1, wherein the diameter of the first piston and the outer diameter of the first and the second parts of the second piston deviate from each other by a maximum of 10 mm.

4. The injection nozzle according to claim 1, wherein the actuator cylinder comprises a housing in which the first piston is arranged and wherein the second piston acts in the housing as a linear bearing for the first piston.

5. The injection nozzle according to claim 1, wherein the connection channel is arranged in the second piston.

6. The injection nozzle according to claim 1, wherein the second fluid chamber and the third fluid chamber are supplied with pressurized fluid by a common supply line.

7. The injection nozzle according to claim 1, wherein at least one heating element is arranged next to a closure element.

8. The injection nozzle according to claim 7, wherein the heating element is arranged in a bore of a closure element housing.

9. The injection nozzle according to claim 8, wherein the closure element housing comprises two heating elements and the closure element is arranged between them.

10. The injection nozzle according to claim 1, wherein the closure element and the first piston are interconnected to each other by a drive shaft.

11. The injection nozzle according to claim 1, wherein the first piston and the closure element are interconnected to each other by a cam mechanism.

12. The injection nozzle according to claim 11, wherein the cam mechanism comprises a wedge and at least one side plate.

13. The injection nozzle according to claim 12, wherein at least one side plate is attached to the wedge as a separate part.

14. The injection nozzle according to claim 12, wherein the wedge comprises at least one first drive surface foreseen to interact with a second drive surface arranged at the closure element at least during closing of the closure element.

15. The injection nozzle according to claim 14, wherein the at least one side plate comprises a third drive surface foreseen to interact with a fourth drive surface arranged at the closure element at least during opening of the closure element.

16. The injection nozzle according to claim 15, wherein the third drive surface is arranged at a protrusion of the at least one side plate extending parallel to and spaced a distance apart from the first drive surface.

17. The injection nozzle according to claim 15, wherein the fourth drive surface is arranged in a notch arranged at the closure element.

18. The injection nozzle according to claim 1, wherein the closure element is limited in the intermediate position between the fully opened and the fully closed position by the first piston abutting the bushing.

19. A method for operating an injection nozzle, comprising the following method steps:
 a. providing an injection nozzle according to claim 1 for injecting melted plastic material into a mold cavity of a thereto interconnected injection mold for forming therein a molded body
 b. during an injection molding cycle, pressurizing, the first piston such that the thereto interconnected closure element moves into the fully open position;
 c. after sufficient melted plastic material is injected into the thereto connected injection mold, pressurizing the first piston such that the thereto interconnected closure element moves into the fully closed position;
 d. after solidifying of the injected plastic material to a certain degree, pressurizing the second piston such that the thereto interconnected closure element is moved into the intermediate position; and
 e. opening the injection mold and removing the therein formed molded body.

\* \* \* \* \*